L. A. CARTER.
QUICK CHANGE MECHANISM.
APPLICATION FILED APR. 30, 1917.
1,296,161.
Patented Mar. 4, 1919.
2 SHEETS—SHEET 1.
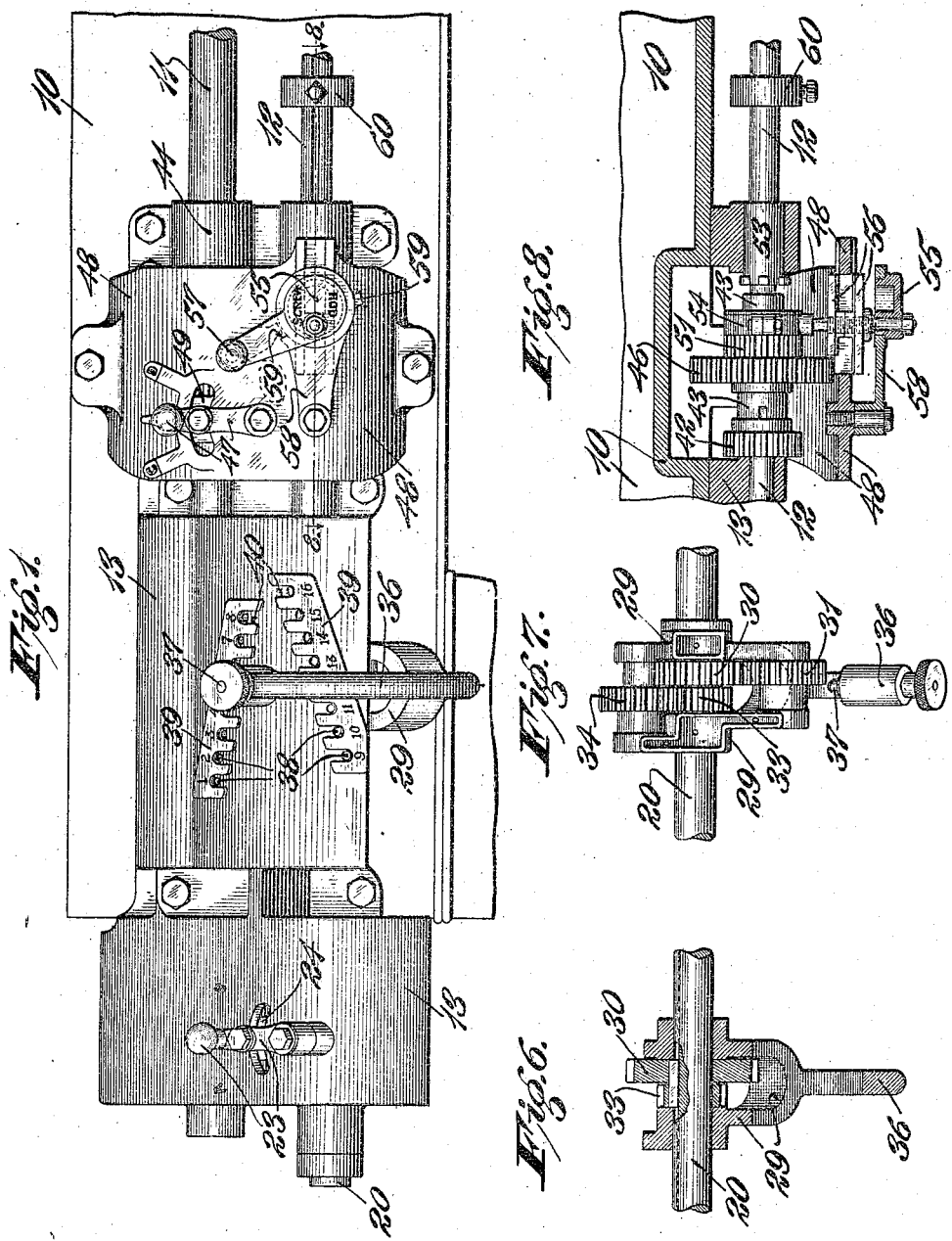
Witnesses:
Edgar T. Farmer
A. W. Holcombe
Inventor:
Lionel A. Carter,
by Carr & Carr,
his Attys.

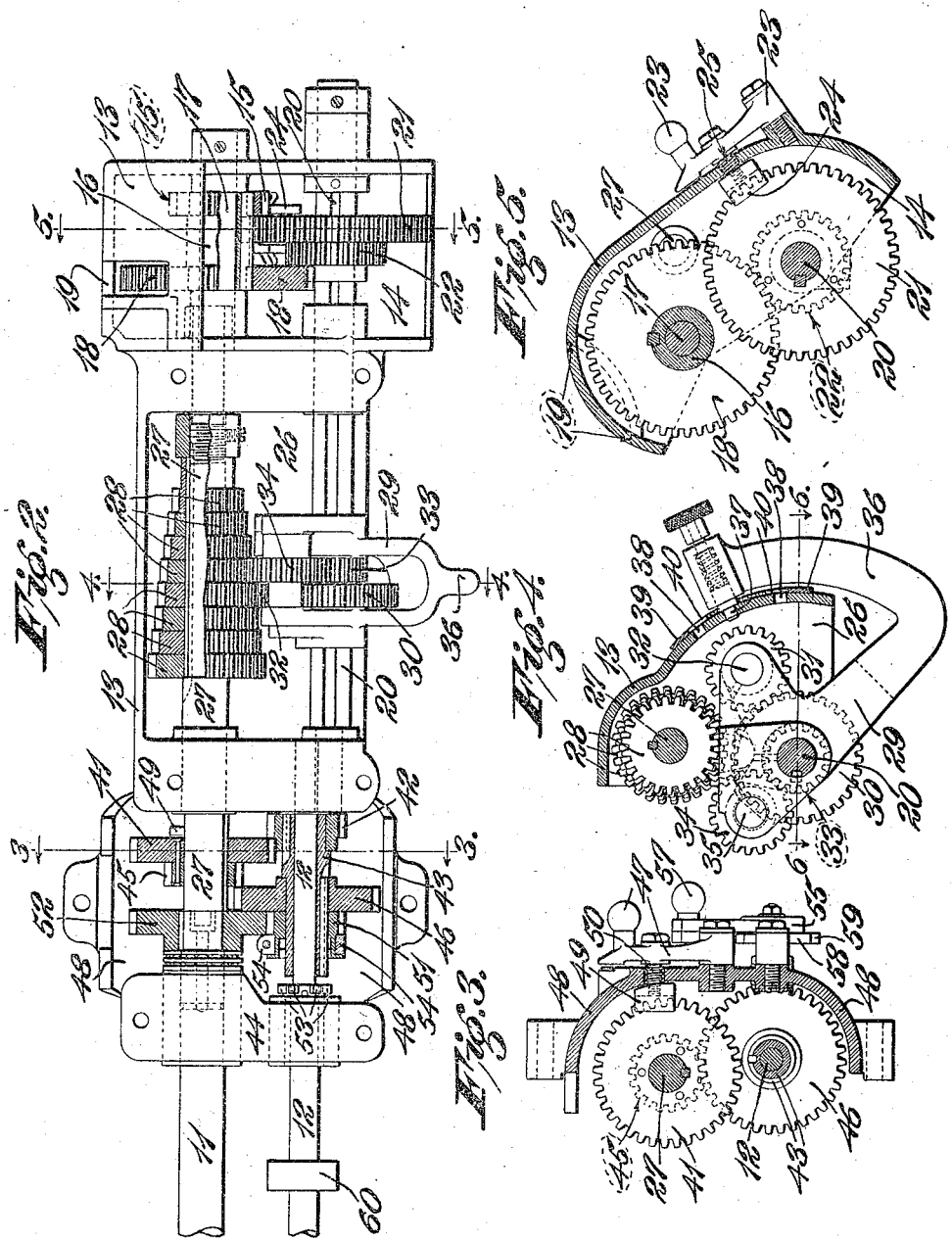

UNITED STATES PATENT OFFICE.

LIONEL A. CARTER, OF ST. LOUIS, MISSOURI.

QUICK-CHANGE MECHANISM.

1,296,161. Specification of Letters Patent. Patented Mar. 4, 1919.

Application filed April 30, 1917. Serial No. 165,341.

*To all whom it may concern:*

Be it known that I, LIONEL A. CARTER, a subject of Great Britain, and a resident of the city of St. Louis and State of Missouri, have invented a new and useful Improvement in Quick-Change Mechanisms, of which the following is a specification.

This invention relates particularly to lathes, but is applicable to quick change gearing for any purpose which requires a large number of different speed ratios. The objects of the invention are strength and simplicity of construction, and ease and rapidity of operation.

The invention consists in providing one shaft with a cone of gears with any one of which either of two gear trains carried by a rocker arm sliding on a second shaft may be brought in mesh. The invention also consists in the combination of one or more sets of sliding gears with the cone of gears and rocker arm speed ratio changing device for multiplying the number of speed ratios obtainable with a given number of gears in the cone. The invention further consists in the details of the rocker arm construction and sliding gear shifting devices.

The objects and details of the invention are further described hereinafter, reference being had to the accompanying drawings which illustrate a preferred form of the invention. What is claimed as the invention appears in the appended claims.

In the drawings, wherein the same parts are designated by the same reference characters in the several views, Figure 1 is a side elevation of a quick change mechanism for a lathe;

Fig. 2 is a view of the same detached from the lathe, looking from the inside of the housing;

Figs. 3, 4 and 5 are vertical cross-sections of the same, on the lines 3—3, 4—4, and 5—5, respectively, in Fig. 2, looking in the direction of the arrows;

Fig. 6 is a horizontal cross-section of the rocker arm, on the line 6—6 in Fig. 4;

Fig. 7 is a plan view of the rocker arm; and

Fig. 8 is a horizontal cross-section of the shifting mechanism for the screw and rod driving gearing, on the line 8—8 in Fig. 1.

The quick change mechanism is shown in the drawings mounted upon the side of a lathe 10 for operating the lead screw 11 and feed rod 12. The mechanism comprises three groups of change gears, contained in a housing 13 which is bolted to the side of the lathe near its head end, each group of gears being operated by a separate operating handle, as hereinafter described. A clutch device is also provided for connecting either the lead screw or the feed rod to the quick change mechanism.

Referring particularly to Figs. 2 and 5, the housing 13 has a chamber 14 at its end which projects beyond the head end of the lathe, and contains the first set of change gears comprising two trains. One of the gear trains comprises a gear 15 which is keyed upon a sleeve 16 which is mounted for rotation upon a shaft 17 which is supported in bearings in the housing 13. The sleeve 16 is rotated by means of a gear 18, which in turn is driven from the head spindle of the lathe by suitable gearing, not shown. A slot 19 is left in the top of the housing 13 for the last gear of the train which drives the gear 18. Below the shaft 17 is a splined shaft 20 which carries a pair of sliding gears, the larger, 21, of which is adapted to be slid into mesh with the gear 15, the two gears when in mesh forming a 1 to 2 speed reduction gear train, which drives the shaft 20 at one-half of the speed of the sleeve 16. The smaller gear 22 of the pair of sliding gears is adapted to be slid into mesh with the gear 18, the two gears when in mesh forming a 2 to 1 speed multiplying gear train which drives the shaft 20 at twice the speed of the sleeve 16.

The pair of sliding gears 21 and 22 are controlled by means of a hand lever 23 pivoted on the outside of the housing 13. The hand lever has a stud which projects through a slot in the housing 13 and carries a forked shoe 24 which embraces the rim of the gear 21. A coil spring 25 which is arranged on the stud between the forked shoe and the handle holds the forked shoe against rattling or chattering. The outside of the housing is marked A and B to indicate the positions of the handle for setting the sliding gears to drive the shaft 20 through the 1 to 2 reduction train when set at A and the 2 to 1 multiplying train when set at B. The splined shaft 20 extends through the chamber 14 into the chamber 26 in the housing 13 which contains the second set of change gears comprising sixteen trains. Over the shaft 20 and parallel therewith there is arranged a shaft 27 which has a series of eight gears 28 keyed upon it. These gears range in size from 16 teeth to 28 teeth, adjacent gears varying in size by one or two teeth from each other, the series of gears 28 forming a stepped cone. The number of gears in the cone, and the number of teeth in said gears, may be varied in different cases to suit the purpose for which the quick change mechanism is intended.

A rocker arm 29 is slidably and pivotally mounted upon the splined shaft 20, as shown in Figs. 2 and 4, and carries two trains of gears either one of which may be caused to engage with any one of the gears 28 in the stepped cone to drive the shaft 27. One of the trains carried by the rocker arm consists of the large gear 30 which is splined on the shaft 20 and which drives the small gear 31 which is mounted to rotate idly on the shaft 32 in the front branch of the rocker arm. The other rocker arm gear train consists of the small gear 33, which has one-half as many teeth as the gear 30, and which is likewise splined on the shaft 20. The gear 33 drives a gear 34 which is mounted to rotate idly on the shaft 35 in the rear branch of the rocker arm. By shifting the rocker arm along on the shaft 20 and swinging the handle 36 of the rocker arm up, the gear 31 may be engaged with any one of the cone gears 28; and by shifting the rocker arm and swinging the handle 36 down, the gear 34 may be engaged with any one of the cone gears 28.

It is noted that by reason of the gears 31 and 34 being mounted on the respective branches or arms of the oscillatable yoke or rocker arm 29, they effect engagement with the gears on the cone-shaft on opposite sides thereof; and, in consequence of this arrangement, the weights of the two trains are fairly well balanced so as to facilitate shifting, and the cone gears may be set closer together than would be feasible if the gears 31 and 34 were arranged alongside of each other.

The handle 36 and rocker arm may be secured in any set position to hold the gear trains in proper mesh by means of the spring pressed pin 37, the end of which is adapted to engage any one of a series of holes 38 in the housing 13. The holes are arranged in two rows, one over the other, marked 1 to 8 and 9 to 16, respectively, corresponding to the sixteen changes which may be obtained in the speed of the shaft 27 by driving one or another of the eight gears 28 through one or the other of the two trains of gears carried by the rocker arm. Guide plates 39 are provided upon the housing 14 having slots 40 in their adjacent edges corresponding to the various set positions of the handle 36 for guiding the pin into the holes 38. These slots are so arranged that the rocker arm must first be shifted laterally opposite the cone gear 28 which it is desired to drive, and then the handle is swung up or down to bring the teeth of the gears 31 or 34 radially into mesh, thereby preventing meshing at the corners of the teeth.

The shaft 27 is in alinement with the lead screw 11 and its end remote from the chamber 14 projects out of the chamber 26, and has a teat which fits into the end of the lead screw. The projecting end of the shaft 27 is splined and carries a pair of sliding gears, as shown in Figs. 2 and 3. The larger gear 41 of the pair is adapted to be shifted to mesh with the gear 42 keyed on a sleeve 43 which turns on the end of the feed rod 12, which is journaled in the end of the housing 13. The feed rod and lead screw are journaled near their ends in the bearing block 44, which is bolted to the side of the lathe. The gear 42 has one-half as many teeth as the gear 41, the two gears when in mesh forming a 2 to 1 speed multiplying train which drives the sleeve at twice the speed of the shaft 27. The smaller gear 45 of the pair of sliding gears on the end of the shaft 27 is adapted to be shifted to mesh with the larger gear 46 on the sleeve 43. The gear 46 has twice as many teeth as the gear 45, the two gears forming a 1 to 2 speed reduction train for driving the sleeve 43 at one-half the speed of the shaft 27.

The sliding gears 41 and 45 are controlled by means of a hand lever 47 pivoted on the gear guard 48, which is bolted to the front of the lathe to cover the 2 to 1 speed multiplying gear train, the 1 to 2 speed reduction train and the clutch for the rod and screw. The letters C and D are marked on the outside of the gear guard 48 to designate the positions to set the handle for driving through the 2 to 1 speed multiplying train when set at C and the 1 to 2 speed reduction train when set at D. The handle 47 controls the gears 41 and 45 by means of a forked shoe 49, which is held in place by a spring 50, the two gear trains covered by the gear guard 48 operating similarly to the two gear trains in the housing 13 at the head of the quick change mechanism.

The sleeve 43 is splined and carries a sliding clutch gear 51 which has external teeth for meshing with the gear 52 on the end of the lead screw, and internal teeth for meshing with the toothed clutch 53 near the end of the feed rod, depending upon whether the clutch is thrown one way or the other. The clutch is controlled by means of a yoke 54 which has a stem passing through a slot in the gear guard 48 and provided with an eccentric 55 on its outer end for operating it. The stem is guided to keep it parallel by means of slides 56 which engage ways on opposite faces of the gear guard. The eccentric is provided with a handle 57 for turning it in its bearing in the end of the swinging arm 58 which is pivoted on the outside of the gear guard 48 and which oscillates up and down when the eccentric is thrown one way or the other. The swinging arm 58 has stops 59 for limiting the throw of the eccentric, these stops being so positioned that the weight of the handle of the eccentric will hold it in either position and hold the sliding gear clutch 51 in engagement with the clutch 53 on the feed rod or in mesh with the gear 52 on the lead screw. The eccentric is marked "Screw" on one side and "Rod" on the other side, as shown in Fig. 1, to indicate which position the gear clutch is in.

The feed rod 12 is movable lengthwise toward the head end of the lathe to disengage the clutch 53 from the gear clutch 51 which has a groove in it to permit it. The feed rod is provided with an adjustable collar 60 against which the apron of the carriage strikes at the end of its feeding movement to move the rod and disengage the clutch to stop further feeding. For this reason it is essential that the gear clutch 51 be in its proper position, and the eccentric shifting device, by insuring that it shall be in one or the other extreme position, obviates any danger of the automatic stop not throwing the clutch 53 out of engagement arising from carelessness in shifting the gear clutch by hand.

The quick change gearing shown and described above provides forty-eight speed changes by manipulating the two sets of sliding gears in the housing 13, and the two sets of gears covered by the gear guard 48 and the rocker arm. The cone has but eight gears, and altogether only seven gears are in mesh for driving the feed rod, and nine gears in mesh for driving the lead screw. The device is compact and the shafts are short, reducing the chatter of the gears, and except for the gears in the rocker arm only gears that are working are in mesh.

The invention is not restricted to the sizes, shapes and arrangements of parts shown and described.

I claim the following as my invention:

1. A quick change mechanism comprising a driven shaft, and two parallel shafts arranged alongside of each other, one of which parallel shafts extends to the one hand and the other parallel shaft extends to the other hand of their lapping portions, means for rotating one of said shafts at either of two speeds one of which is four times the other, said means being arranged on the projecting end of said shaft, variable speed gearing connecting the lapping portions of said shafts, and means arranged on the other projecting shaft end for driving said driven shaft at either of two speeds for each speed of said other projecting shaft one of which is more than twice that of the other.

2. A quick change mechanism comprising a driven shaft, and two parallel shafts arranged alongside of each other, one of which parallel shafts extends to the one hand and the other parallel shaft extends to the other hand of their lapping portions, means for rotating one of said shafts at either of two speeds, said means being arranged on the projecting end of said shaft, variable speed gearing connecting the lapping portions of said shafts, and means arranged on the other projecting shaft end for driving said driven shaft at either of two speeds for each speed of said other projecting shaft, whereby for each speed of the variable speed gearing two additional speeds of the driven shaft may be obtained.

Signed at St. Louis, Missouri, this 27th day of April, 1917.

LIONEL A. CARTER.

Copies of this patent may be obtained for five cents each, by addressing the "Commissioner of Patents, Washington, D. C."